(12) United States Patent
Kobayashi et al.

(10) Patent No.: US 9,466,099 B2
(45) Date of Patent: Oct. 11, 2016

(54) IMAGE EVALUATION DEVICE AND IMAGE EVALUATION PROGRAM WITH NOISE EMPHASIS CORRELATING WITH HUMAN PERCEPTION

(71) Applicant: SEIKO EPSON CORPORATION, Tokyo (JP)

(72) Inventors: Takashi Kobayashi, Matsumoto (JP); Makoto Fujino, Shiojiri (JP); Yoshio Okumura, Matsumoto (JP); Bunei Kyuu, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 56 days.

(21) Appl. No.: 14/567,921

(22) Filed: Dec. 11, 2014

(65) Prior Publication Data

US 2015/0170351 A1    Jun. 18, 2015

(30) Foreign Application Priority Data

Dec. 12, 2013 (JP) ................. 2013-256721

(51) Int. Cl.
*G06K 9/00* (2006.01)
*G06T 7/00* (2006.01)
*G06T 7/40* (2006.01)

(52) U.S. Cl.
CPC .............. *G06T 7/0002* (2013.01); *G06T 7/00* (2013.01); *G06T 7/408* (2013.01); *G06T 2207/10008* (2013.01); *G06T 2207/20056* (2013.01); *G06T 2207/30168* (2013.01)

(58) Field of Classification Search
None
See application file for complete search history.

(56) References Cited

U.S. PATENT DOCUMENTS

| 8,320,658 | B2 | 11/2012 | Tanizaki et al. | |
|---|---|---|---|---|
| 2007/0257944 | A1* | 11/2007 | Miller | G09G 3/3225 345/694 |
| 2012/0189216 | A1* | 7/2012 | Segall | G06T 5/002 382/232 |
| 2013/0016277 | A1* | 1/2013 | Ito | G02B 7/36 348/353 |
| 2013/0108163 | A1 | 5/2013 | Fujii et al. | |
| 2013/0155193 | A1 | 6/2013 | Ikeda | |

FOREIGN PATENT DOCUMENTS

JP    2008-064629 A    3/2008

OTHER PUBLICATIONS

Extended European Search Report dated Aug. 5, 2015 as received in Application No. 14197189.5.

\* cited by examiner

*Primary Examiner* — Feng Niu
(74) *Attorney, Agent, or Firm* — Maschoff Brennan (57) ABSTRACT

An image evaluation device includes an image acquisition section that acquires an input image to be evaluated, a noise image generation section that generates a noise image that emphasizes noise included in the input image and having a particular spatial frequency that correlates with human perception, a statistic value acquisition section that acquires a predetermined type statistic value from the noise image, and a noise amount specification section that specifies an amount of noise in the input image on the basis of the statistic value.

6 Claims, 8 Drawing Sheets

IMAGE EVALUATION DEVICE AND IMAGE EVALUATION PROGRAM WITH NOISE EMPHASIS CORRELATING WITH HUMAN PERCEPTION

CROSS-REFERENCE TO RELATED APPLICATIONS

This application claims priority to Japanese Patent Application No. 2013-256721 filed on Dec. 12, 2013. The entire disclosure of Japanese Patent Application No. 2013-256721 is hereby incorporated herein by reference.

BACKGROUND

1. Technical Field

The present invention relates to image evaluation devices and image evaluation programs.

2. Related Art

The quality of images output from an image output device such as a display device and a printer is evaluated.

There is a known unevenness inspection method for inspecting the presence of unevenness in a panel material. The method includes acquiring a plurality of primary images by imaging the panel material under inspection under a plurality of conditions; creating a plurality of secondary images by processing the plurality of primary images to enhance the variation in the images; creating a composite image by combining the plurality of secondary images with a prescribed weighting; and determining the presence of unevenness using the composite image (see, for example, JP-A-2008-64629).

An existing image quality evaluation according to subjectivity (i.e., sensory evaluation) may not provide a consistent result due to personal differences between inspectors conducting the evaluation. On the other hand, in an objective evaluation using an inspection device, although evaluation accuracy is consistent at a certain level, human visual perception is not sufficiently taken into consideration; therefore, the result of the objective evaluation sometimes greatly differs from the result of the sensory evaluation. In addition, since a human's sense of sight is affected by various elements such as the environment and the material of an object under evaluation, the influence of each of those elements needs to be considered for accurate evaluation.

SUMMARY

An advantage of some aspects of the invention is to provide an image evaluation device and an image evaluation program with which an evaluative result close to a sensory evaluation result can be obtained stably and easily, while the human visual perception is taken into consideration.

According to an aspect of the invention, an image evaluation device includes an image acquisition section that acquires an input image to be evaluated, a noise image generation section that generates a noise image that emphasizes noise included in the input image and having a particular spatial frequency that correlates with human perception, a statistic value acquisition section that acquires a predetermined type statistic value from the noise image, and a noise amount specification section that specifies an amount of noise in the input image on the basis of the statistic value.

According to the invention, the noise image that emphasizes noise having a particular spatial frequency that correlates with human perception is generated, and an amount of noise of the input image (i.e., an evaluation value of the input image) is determined on the basis of the statistic value acquired from the noise image. Therefore, an evaluation result which is close to a result of sensory evaluation based on the human visual perception can be obtained.

It is preferable that the image evaluation device further include a background noise calculation section that calculates background noise included in the input image and having a spatial frequency different from the particular spatial frequency. In this case, the noise image generation section may generate the noise image that is corrected in accordance with a level of the background noise.

The input image may include background noise attributed to characteristics or the like of a medium (material) of the image. Although human is not clearly aware of such background noise, it affects the visibility of noise which human mainly recognizes. According to the structure described above, the noise image is generated with the influence of the background noise taken into consideration, whereby an accurate evaluation result on the basis of human visual perception can be obtained.

It is preferable that the image evaluation device further include a brightness calculation section that calculates brightness of the input image. In this case, the noise image generation section may generate the noise image that is corrected according to the brightness.

The brightness of the input image affects the visibility of noise which human mainly recognizes. According to the structure described above, the noise image is generated with the influence of the brightness taken into consideration, whereby an accurate evaluation result on the basis of the human visual perception can be obtained.

It is preferable that the statistic value acquisition section acquire the statistic value of each region in the noise image.

According to this structure, since the statistic value of each region in the noise image is acquired, non-cyclic noise can be easily captured.

It is preferable that the statistic value acquisition section determine a size of the region in accordance with a predetermined field of view and observation distance and acquires the statistic value of each region having the size.

According to this structure, since the statistic value is obtained per region recognized by a sense of sight of human eyes, an accurate evaluation result based on the human's sense of sight can be obtained.

Note that the statistic value is a value representing color value distribution in the noise image and it is preferable that the statistic value be a standard deviation of the color value in the noise image.

A technical idea of the invention may be realized not only by the above-mentioned image evaluation device, but also as various categories such as a method, a system, a computer program, or a computer readable recording medium storing such a program. As an example of such a case, according to another aspect of the invention, an image evaluation program can be given that causes a computer to execute processing including an image acquisition function that acquires an input image to be evaluated, a noise image generation function that generates a noise image that emphasizes noise included in the input image and having a particular spatial frequency that correlates with human perception, a statistic value acquisition function that acquires a predetermined type statistic value from the noise image, and a noise amount specification function that specifies an amount of noise in the input image on the basis of the statistic value.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, one embodiment will be described with reference to the drawings.

1. Outline of Device Configuration

Figure 1:
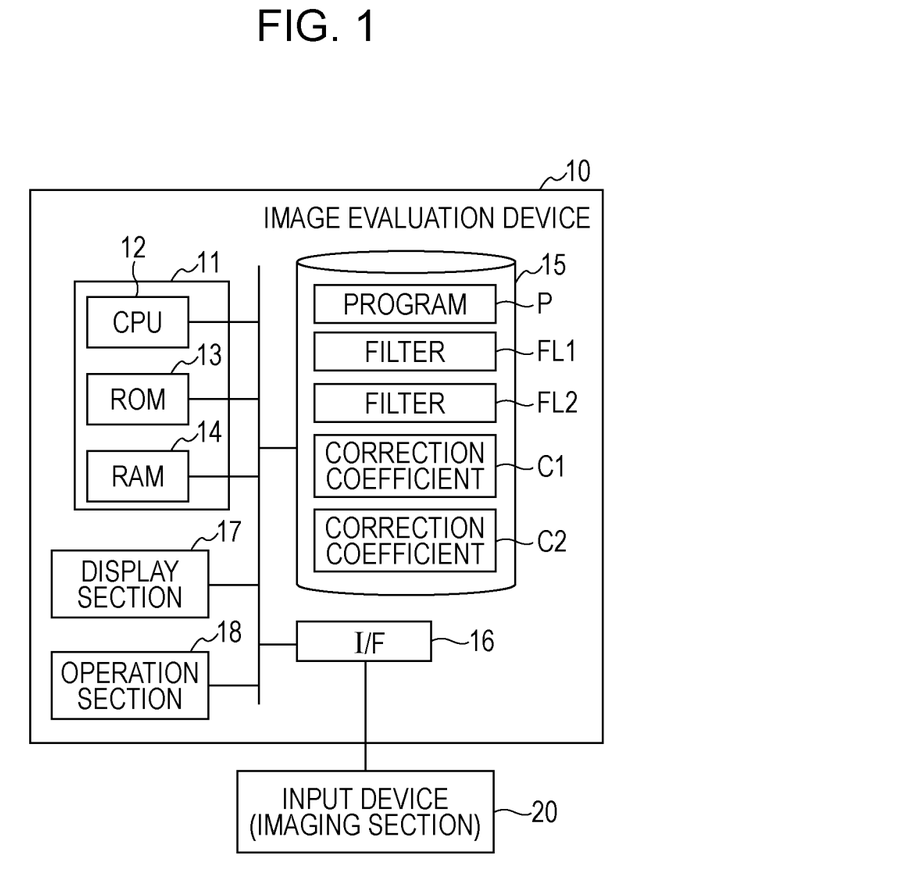
FIG. 1 is a schematic diagram illustrating a device configuration according to one embodiment.

FIG. 1 is a schematic diagram illustrating a configuration of an image evaluation system according to this embodiment. An image evaluation system includes an image evaluation device 10 and an input device 20. An image evaluation program (program P) is stored in the image evaluation device 10. The image evaluation device 10 may be a desktop or laptop personal computer (PC) or a jig or the like which is composed exclusively for image evaluation. The input device 20 includes an imaging section. Specifically, the input device 20 is a camera, a scanner, or the like which can capture (read) images with imaging section thereof.

The image evaluation device 10 and the input device 20 in the image evaluation system may be separate devices communicably connected. Alternatively, the image evaluation device 10 and the input device 20 may be provided together in one product. That is, the image evaluation device 10 may include the input device 20 as a part of configuration thereof. In that case, it can be said that the image evaluation device 10 alone constitutes the image evaluation system.

In the image evaluation device 10, a CPU 12, which is the center of an arithmetic process, controls the entire image evaluation device 10 via a system bus. A ROM 13, a RAM 14, and an interface (I/F) 16 are connected to the system bus. In addition, a memory section 15 including a hard disk drive (HDD) or a semiconductor memory is also connected to the system bus. The memory section 15 stores an operating system, an application program, the program P, filters FL1 and FL2, correction coefficients C1 and C2, and the like. Those programs and data are read to the RAM 14 as appropriate by the CPU 12, and a predetermined process (such as an image evaluation process described later) is executed by the CPU 12. The CPU 12, the ROM 13, and the RAM 14 are collectively referred to as a control section 11. The I/F 16 is connected to the input device 20. The image evaluation device 10 further includes a display section 17 and an operation section 18. The display section 17 includes, for example, a liquid crystal display. The operation section 18 includes, for example, a keyboard, a mouse, a touch pad, a touch screen, a button, a switch, and the like.

Figure 2:
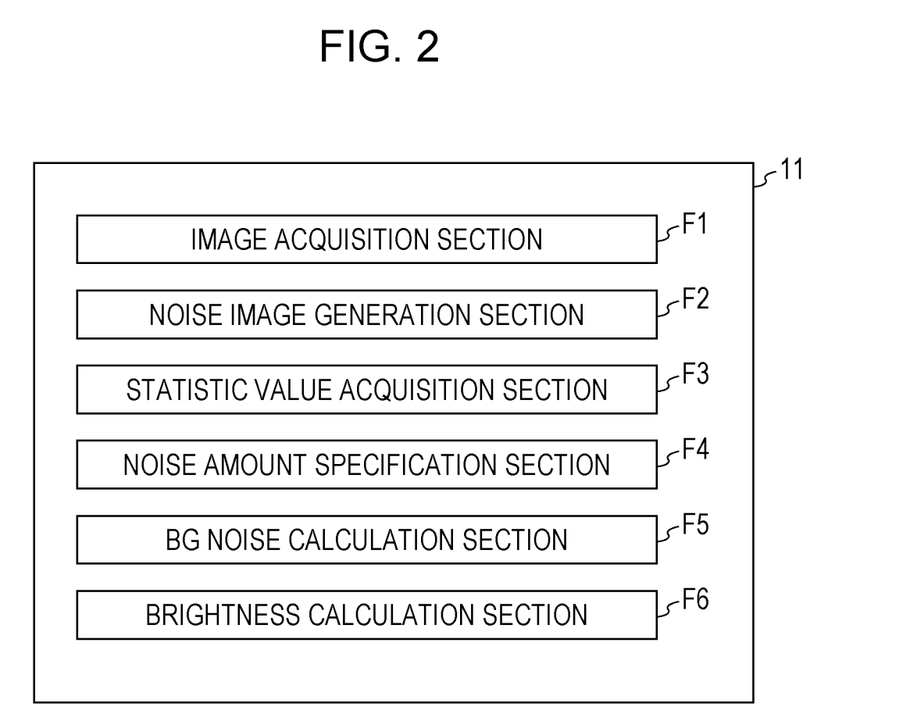
FIG. 2 is a block diagram illustrating functions of a control section.

FIG. 2 illustrates functions of the control section 11 executing a process in accordance with the program P. According to FIG. 2, the control section 11 includes an image acquisition section F1, a noise image generation section F2, a statistic value acquisition section F3, a noise amount specification section F4, a background (BG) noise calculation section F5, a brightness calculation section F6, and the like. Those functions will be described later.

2. Image Evaluation Process

Figure 3:
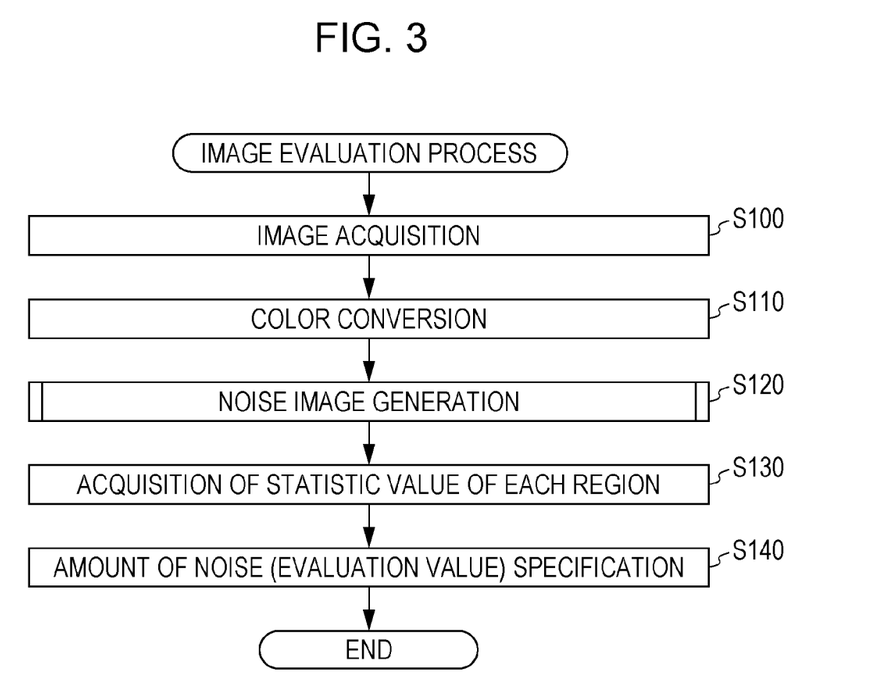
FIG. 3 is a flowchart illustrating an image evaluation process.

FIG. 3 is a flowchart illustrating an image evaluation process which the control section 11 executes in accordance with the program P.

In Step S100, the image acquisition section F1 acquires an input image to be evaluated from the input device 20 via the I/F 16. The input image is an image which is to be captured by an imaging section of the input device 20. The input device 20, for example, captures an image to be displayed on a display device (not illustrated), which is the target of inspection, or, an image of an image printed by a printer (not illustrated), which is another target of inspection. The input image is, for example, bit map data where each pixel has gradation values of R (red), G (green), and B (blue).

In the Step S110, the image acquisition section F1 converts the input image acquired in the Step S100 into data based on a color space, which is used for the evaluation (color conversion). For example, (RGB) values of each pixel in the input image are converted into color values consisting of $L^*$, $a^*$, and $b^*$ components of the CIE $L^*a^*b^*$ color space defined by the International Commission on Illumination (CIE). The color conversion from RGB into $L^*a^*b^*$ can be executed using a known color conversion profile or the like. Note that in the Step S110, the image acquisition section F1 may execute a color correction process on an input image before the color conversion, and then execute the color conversion. Here, the term color correction process, for example, refers to a process for correcting a color balance of signals obtained by the imaging section in the input device 20.

In Step S120, the noise image generation section F2 generates a noise image from the input image which has been subjected to the color conversion in the Step S110. In the noise image, noise which is in the input image and corresponds to a particular spatial frequency that correlates with human perception (hereinafter, such noise is also referred to as perception noise) is emphasized.

Figure 4:
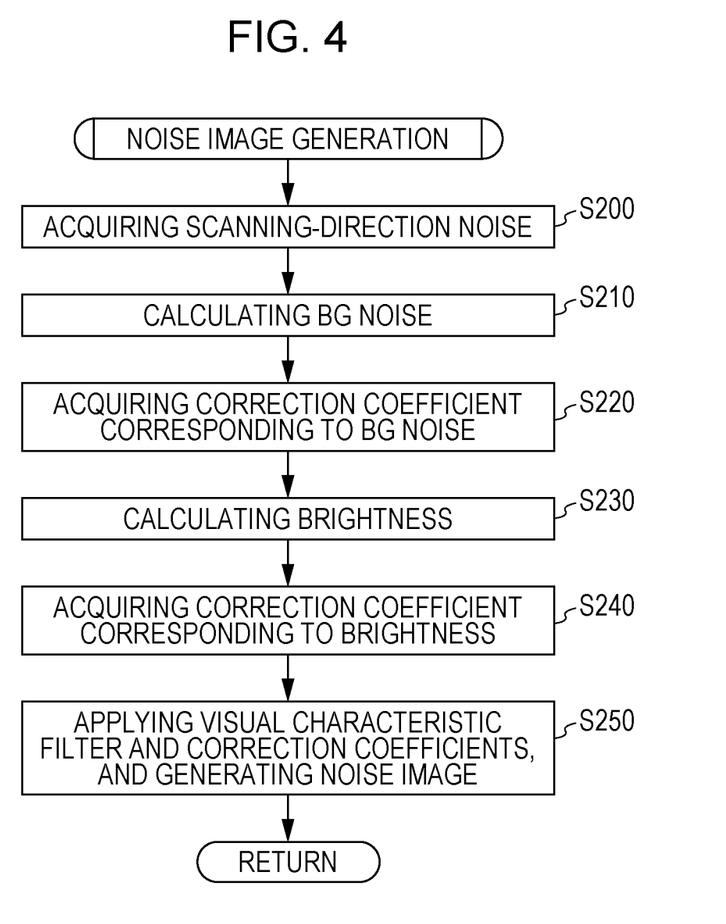
FIG. 4 is a flowchart illustrating details of noise image generation.
Figure 5:
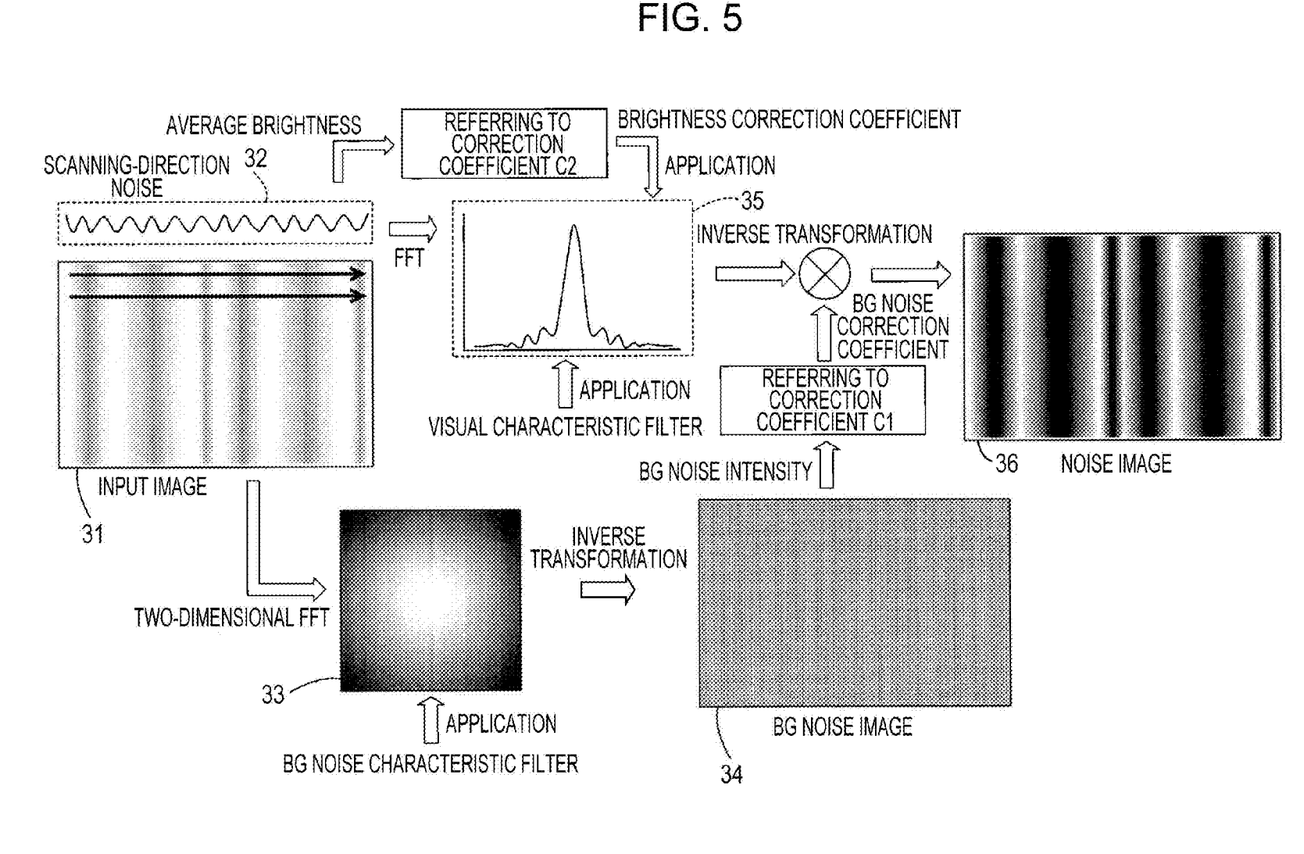
FIG. 5 illustrates processing of noise image generation.

FIG. 4 is a flowchart illustrating details of noise image generation in the Step S120. FIG. 5 illustrates processing of the noise image generation.

In Step S200, the noise image generation section F2 acquires a noise in a scanning direction (see, the reference numeral 32 in FIG. 5) by scanning the input image (see, the reference numeral 31 in FIG. 5) in a certain direction. Here, as an example, an input image 31 is given where streak-like cyclic and non-cyclic density unevenness is observed in one direction as illustrated in FIG. 5. Such density unevenness is, for example, caused by an uneven amount of a print medium being transported when a printer is printing an image to be captured by the input device 20.

In the input image 31 given as an example in FIG. 5, since vertical streak-like density unevenness is observed, the input image 31 is scanned in a horizontal direction perpendicular to the streaks (as indicated by the arrows illustrated in the input image 31 in FIG. 5). As a result of scanning, one scanning-direction noise 32 is acquired per scan. The scanning-direction noise 32 represents fluctuations of brightness L* in the input image 31 in the scanning direction. For simple description, hereinafter, it is assumed that data of brightness is acquired from the input image 31, although this embodiment does not exclude the case where the a* component, b* component, or a value acquired by linear addition or the like of the L*, a*, and b* components of the input image 31 is used in this Step S200 or Step S210 described later. The noise image generation section F2 acquires the scanning-direction noise 32 for each pixel column which intersects with the scanning direction. Here, the pixel column includes a plurality of pixels aligned in the scanning direction.

In the Step S210, the BG noise calculation section F5 calculates background (BG) noise, which is noise included in the input image 31 and corresponds to a spatial frequency which is different from the above-mentioned particular spatial frequency. First, the BG noise calculation section F5 converts the input image 31 (an image including brightness of each pixel) into a spatial frequency distribution. Here, the BG noise calculation section F5 obtains a two-dimensional spatial frequency spectrum (see, the reference numeral 33 in FIG. 5) by two-dimensional Fourier Transform (two-dimensional FFT: Fast Fourier Transform) of the input image 31. Then, the BG noise calculation section F5 applies a BG noise characteristic filter to the two-dimensional spatial frequency spectrum 33. The BG noise characteristic filter is included in the image evaluation device 10 as a filter FL1 (see, FIG. 1) in advance. The BG noise calculation section F5 reads out and uses the filter FL1.

The term BG noise refers to noise which is hardly perceived by human (hardly recognized by a person viewing an image) but is actually included in the input image 31. The BG noise has generally a higher frequency than the perception noise. For example, if a print medium which is used for printing an image to be captured by the input device 20 has a surface with small roughness, such roughness is one of the causes of the BG noise. In addition, graininess of ink dots forming the printed image may be another cause of the BG noise.

Figure 6A:
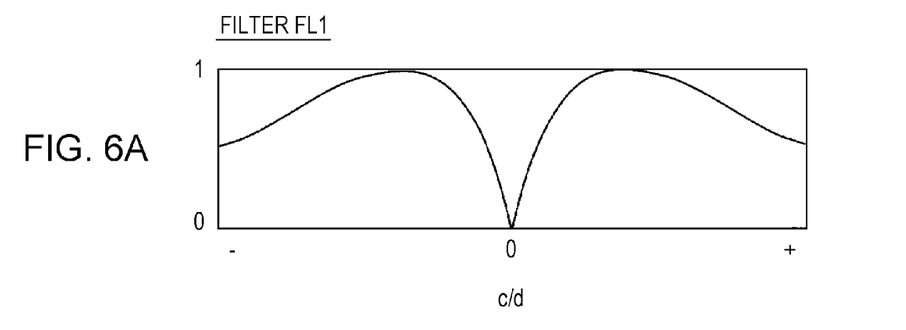
FIGS. 6A and 6B each illustrate a transmission band of a filter.

FIG. 6A illustrates an example of transmission band of the BG noise characteristic filter (the filter FL1). The horizontal axis represents cycles/degree (or cycles/mm) and the vertical axis represents response intensity (0 to 1 time). In the BG noise characteristic filter, the center of the horizontal axis is 0, and the response intensity increases towards an outer side (a high-frequency side), reaches the maximum value 1 at a certain high-frequency region, and gradually decreases toward a further outer side. Such a BG noise characteristic filter can accurately capture the above-mentioned BG noise with relatively high frequency. The BG noise calculation section F5 rotates the BG noise characteristic filter 360 degrees, thereby applying the BG noise characteristic filter to the whole two-dimensional spatial frequency spectrum 33. In such a manner, a two-dimensional spatial frequency spectrum in which a signal other than signals with a frequency corresponding to the BG noise is accurately attenuated can be obtained.

The BG noise calculation section F5 calculates a BG noise image (see, the reference numeral 34 in FIG. 5) by Inverse Fast Fourier Transform (IFFT) on the two-dimensional spatial frequency spectrum after the application of the BG noise characteristic filter. The BG noise image 34 is an image of brightness in which BG noise is distributed. This corresponds to the Step S210.

In Step S220, the BG noise calculation section F5 calculates the level of the BG noise (the BG noise intensity) on the basis of the BG noise image 34 calculated in the Step S210. There are various indicators of the BG noise intensity; here, the standard deviation of brightness of the BG noise image 34 is calculated and is defined as the BG noise intensity. The BG noise calculation section F5 extracts a correction coefficient corresponding to the BG noise intensity (a BG noise correction coefficient) from the correction coefficients C1 provided in advance (FIG. 1). The image evaluation device 10 includes a plurality of such correction coefficients C1 in advance.

Figure 7:
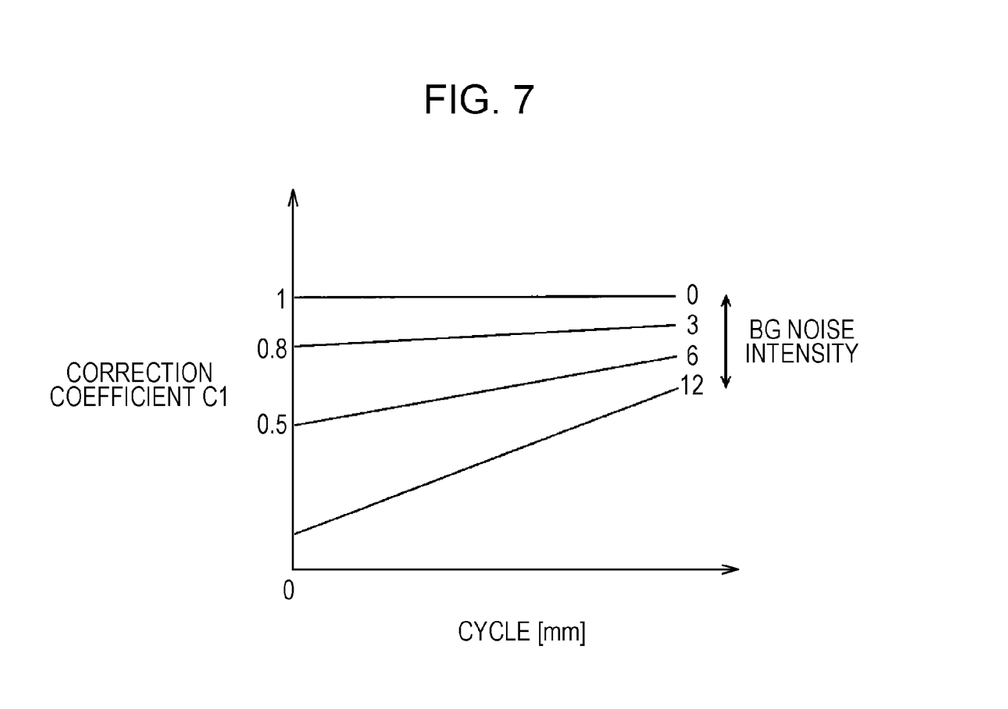
FIG. 7 illustrates an example of a BG noise correction coefficient corresponding to a BG noise intensity.

FIG. 7 illustrates an example of the BG noise correction coefficient (the correction coefficient C1) corresponding to the BG noise intensity. When the BG noise intensity has the minimum value 0, the BG noise correction coefficient is 1, which indicates no correction. The BG noise correction coefficient decreases from 1 as the BG noise intensity increases. In addition, the BG noise correction coefficient corresponding to the BG noise intensity is set to have a different value depending on the cycle of noise.

In Step S230, the brightness calculation section F6 calculates the brightness of the input image 31. For example, the brightness calculation section F6 calculates the average brightness of the input image 31.

In Step S240, the brightness calculation section F6 extracts a correction coefficient corresponding to the average brightness calculated in the Step S230 (a brightness correction coefficient) from the correction coefficients C2 provided in advance (FIG. 1). The image evaluation device 10 stores a correspondence between the average brightness and the correction coefficient C2 in advance.

Figure 8:
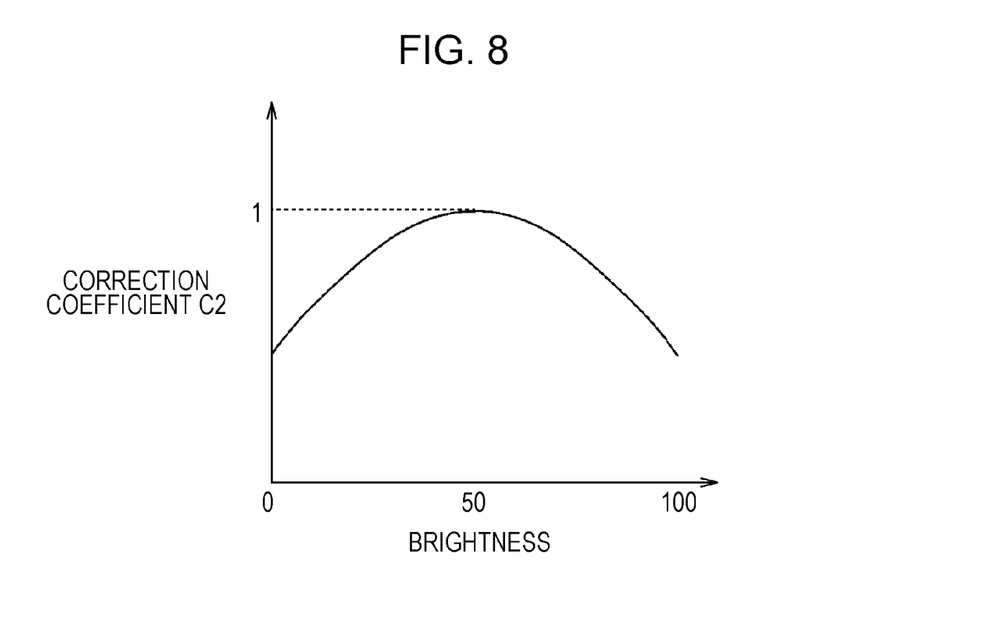
FIG. 8 illustrates an example of a brightness correction coefficient corresponding to brightness.

FIG. 8 illustrates an example of the brightness correction coefficient (the correction coefficient C2) versus the average brightness (the horizontal axis). When the brightness is around the intermediate value (50), the brightness correction coefficient is 1, which indicates no correction, and decreases from 1 as the brightness increases or decreases.

In Step S250, the noise image generation section F2 generates a noise image (see, the reference numeral 36 in FIG. 5), using the visual characteristic filter and the correction coefficients (i.e., the BG noise correction coefficient and the brightness correction coefficient) which are acquired in the above-described manner. Note that the order of the processing before the Step S250, that is, acquiring the scanning-direction noise (the Step S200), acquiring the BG noise correction coefficient (the Step S220), and acquiring the brightness correction coefficient (the Step S240), is not limited to the order illustrated in FIG. 4. If the processing capability of the control section 11 allows, these may be performed at the same time.

In the Step S250, the noise image generation section F2 converts each scanning-direction noise 32 into distribution of spatial frequency. Here, the noise image generation section F2 obtains a spatial frequency spectrum (see, the reference numeral 35 in FIG. 5) of each scanning-direction noise 32 by Fast Fourier Transform (FFT) on each scanning-direction noise 32. Then, the noise image generation section F2 applies the visual characteristic filter to the spatial frequency spectrum 35 of each scanning-direction noise 32. The visual characteristic filter is included in the image evaluation device 10 as the filter FL2 (see, FIG. 1) in advance. The noise image generation section F2 reads out and uses the filter FL2.

Figure 6B:
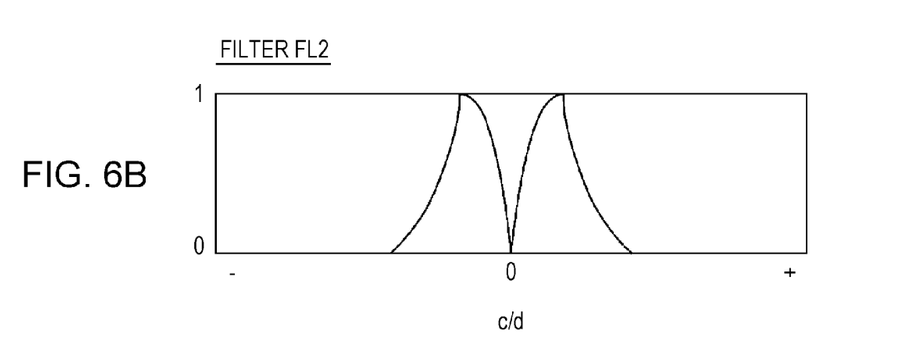

FIG. 6B illustrates an example of the transmission band of the visual characteristic filter (the filter FL2). The vertical axis and the horizontal axis represent cycles/degree (or cycles/mm) and response intensity, respectively, as in the case of the BG noise characteristic filter (the filter FL1). Here, in the visual characteristic filter, the response intensity reaches the maximum value 1 in a relatively low frequency region compared to the BG noise characteristic filter and drastically decreases to 0 at a higher-frequency side. Such a visual characteristic filter is designed on the basis of human visual characteristics; therefore, the response intensity reaches the maximum value in a frequency region which is easily recognized by human (i.e., a particular spatial frequency that correlates with human perception). By application of the visual characteristic filter, the spatial frequency spectrum of each scanning-direction noise 32 in which a signal other than signals with frequency corresponding to the perception noise is accurately attenuated can be obtained.

Note that the noise image generation section F2 also applies the brightness correction coefficient acquired in the Step S240, in applying the visual characteristic filter to the spatial frequency spectrum 35. Specifically, the visual characteristic filter after having a response intensity corrected by the brightness correction coefficient is applied to the spatial frequency spectrum 35. Then, the noise image generation section F2 obtains scanning-direction noises by Inverse Fast Fourier Transform (IFFT) of each spatial frequency spectrum after the application of the visual characteristic filter. Then, such scanning-direction noises are aligned in the direction perpendicular to the scanning direction, whereby two-dimensional noise, i.e., the noise image 36 is generated.

Note that the noise image generation section F2 corrects the scanning-direction noise obtained by the IFFT, using the BG noise correction coefficient acquired in the Step S210. In other words, the BG noise correction coefficient, which is acquired in accordance with the BG noise intensity and corresponds to the cycle of each scanning-direction noise, is multiplied by the scanning-direction noise of corresponding cycle. Then, the noise image 36 is generated from the scanning-direction noises corrected in such a manner by the BG noise correction coefficient. This corresponds to noise image generation (FIG. 4).

In Step S130 (FIG. 3), the statistic value acquisition section F3 acquires a predetermined type statistic value from the noise image generated in the Step S120. In this embodiment, the standard deviation of the color value (for example, brightness) of the noise image is acquired as the statistic value. In this embodiment, the statistic values of each region in the noise image are acquired. The statistic value acquisition section F3 determines, in accordance with a field of view and an observation distance, the size of the region in the noise image where the statistic value to be calculated. The field of view is, for example, 2-degree viewing or 10-degree viewing, while the observation distance is a specific value such as several tens of centimeters or several centimeters. These field of view and observation distance are set beforehand via the operation section 18 by a user operating the image evaluation device 10. That is, the user sets, in the image evaluation device 10, the actual field of view and observation distance employed in observation of an image to be evaluated by the image evaluation device 10.

Figure 9A:
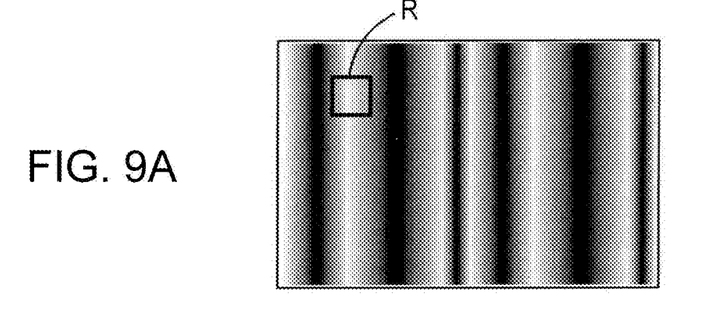
FIGS. 9A and 9B each illustrate regions in a noise image and a level of a standard deviation of each region, respectively.

FIG. 9A illustrates an example of a region R of the noise image which is set by the statistic value acquisition section F3 for calculating the statistic value. In the Step S130, the statistic value acquisition section F3 calculates a standard deviation of each region R having such a size.

Figure 9B:
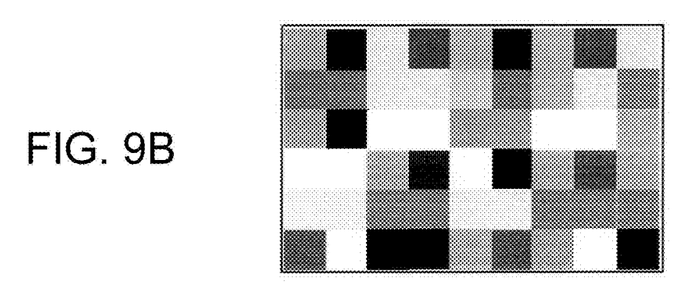

FIG. 9B illustrates an example of a level of the standard deviation calculated in the Step S130 for each region R in the noise image. In FIG. 9B, for example, a darker color indicates a region with a larger standard deviation, while a lighter color indicates a region with a smaller standard deviation.

In the Step S140, the noise amount specification section F4 specifies an amount of noise in the input image on the basis of the statistic value acquired in the Step S130. The noise amount specification section F4 specifies any one of the values like the maximum value, the middle value, and the average value of the above-described standard deviations calculated for each region in the noise image. The value specified by the noise amount specification section F4 is a value which typically represents the level of perception noise of the input image, i.e., an amount of noise of the input image. In this embodiment, the maximum value of the standard deviations calculated for regions is specified as the amount of noise of the input image. The amount of noise specified in such a manner can also be regarded as an evaluation value of the input image.

The image evaluation device 10 (the control section 11) may, as appropriate, display the noise image generated in the Step S120, the image in FIG. 9B which illustrates distribution of the standard deviations of regions, or the amount of noise (value) specified in the Step S140, on the display section 17 to show a user. If the amount of noise given by the image evaluation device 10 exceeds a standard value, for example, the user can judge easily and objectively that the input image has large perception noise and would be rejected by sensory evaluation by human. On the other hand, if the amount of noise is less than the standard value, the user can judge easily and objectively that the input image has small perception noise, and would be accepted by sensory evaluation by human. Note that the statistic value acquired in the Step S130 is not limited to the standard deviation. For example, the standard deviations of the regions may be calculated and then the skewness or kurtosis of the distribution of the standard deviations may be calculated to be used as the statistic value.

3. Conclusion

As described above, according to the image evaluation device 10 of this embodiment, the noise image is generated (the Step S120) in which perception noise having a particular spatial frequency that correlates with human perception is emphasized (i.e., in which noise having spatial frequency other than the particular spatial frequency is attenuated) and an amount of noise (i.e., an evaluation value) of the input image is determined on the basis of the statistic value acquired from the noise image (the Step S140). Therefore, the user can easily obtain (without preparing a large-scale costly inspection device or the like) an evaluation value which is close to a result of sensory evaluation based on the human visual perception.

Note that the BG noise is hardly perceived by human (hardly recognized by a person viewing an image), but when the BG noise is included, the user tends to less recognize the perception noise. Therefore, in order to obtain an accurate evaluation value which is close to the human visual perception, a noise image is preferably generated with the influence of the BG noise taken into consideration. This is the reason why the image evaluation device 10, as described above, calculates BG noise in the input image which having a spatial frequency different from the spatial frequency corresponding to perception noise, and generates a noise image which is corrected in accordance with the intensity of the BG noise. In other words, the noise image which accurately represents perception noise recognized by human when the BG noise is included can be obtained by correcting the noise image in a manner such that as the BG noise intensity increases, the noise in the noise image is reduced.

In addition, the brightness of the input image affects recognition of the perception noise by user. Specifically, when the input image has a brightness L* around 50, the user easily recognizes perception noise; while when the brightness L* is higher or lower, the user tends to less recognize the perception noise. Therefore, in order to obtain an accurate evaluation value which is close to the human visual perception, a noise image is preferably generated with the brightness of the input image taken into consideration. This is the reason why the image evaluation device 10, as described above, generates a noise image corrected in accordance with the brightness of the input image. In other words, by correcting the noise in the noise image in a manner such that the noise is reduced when the brightness of the input image is high or low, the noise image which accurately represents perception noise recognized by human under the influence of the brightness of the input image can be obtained.

Note that in this embodiment, correction using the BG noise correction coefficient or the brightness correction coefficient is not essential. Either one or both of the correction coefficients may not be used. For example, in FIG. 4, the Steps S210, S220, S230, and S240 may be omitted and the visual characteristic filter may be applied to the spatial frequency spectrum 35 obtained from the scanning-direction noise 32 and the noise image 36 may be generated by scanning-direction noise which is obtained from the spatial frequency spectrum after the application in the Step S250.

Note that if the perception noise in the input image is cyclic noise, one statistic value calculated from the whole image can represent the level of the perception noise in the image. On the other hand, if the perception noise in the input image is not cyclic noise, one statistic value calculated from the whole image cannot accurately represent the level of the perception noise in the image. Therefore, in this embodiment, the statistic values of regions in the noise image (local statistic value) are obtained, and a representative value of the statistic values (for example, the maximum value of standard deviations of regions) is specified. In such a manner, even if the perception noise in the input image is not cyclic, one specific amount of noise (i.e., an evaluation value) which accurately represents the level of the perception noise can be determined.

Further, in this embodiment, the region used when the statistic value is calculated from the noise image has a size corresponding to a field of view and an observation distance. This means the statistic value is obtained per region recognized by a sense of sight of human eyes. The amount of noise specified by statistic values of such regions can be regarded as an appropriate amount of noise (i.e., an evaluation value) with a human's sense of sight taken into consideration.

Note that in the noise image generation by the noise image generation section F2 (the Step S120 in FIG. 3 and FIG. 4), the acquisition of the scanning-direction noise 32 from the input image 31 is not essential. For example, the result of frequency analysis (distribution of spatial frequency) of the input image 31 using the two-dimensional FFT or wavelet transformation (the Step S200) may be applied with the above-described visual characteristic filter or correction coefficient, whereby the noise image 36 may be generated (the Step S250).

Further, in the above description, the visual characteristic filter based on the human sensitivity of brightness L* is used for generation of the noise image 36, the visual characteristic filter based on the human sensitivity of a* or b* component may be used. Types of the visual characteristic filter may be selected according to the type or use of an image to be evaluated or various conditions.

Further, in pre-processing before the Step S200, a real space filter such as a moving average filter may be applied to the input image 31. In other words, after removing fine noise in the input image 31 to some extent using such a filter, frequency analysis or application of a visual characteristic filter described above may be performed.

What is claimed is:

1. An image evaluation device comprising:
    an image acquisition section that acquires an input image to be evaluated;
    a noise image generation section that generates a noise image that emphasizes noise included in the input image and having a particular spatial frequency that correlates with human perception;
    a statistic value acquisition section that acquires a predetermined type statistic value from the noise image;
    a noise amount specification section that specifies an amount of noise in the input image on the basis of the statistic value; and
    a background noise calculation section that calculates background noise included in the input image and having a spatial frequency different from the particular spatial frequency,
    wherein the noise image generation section generates the noise image that is corrected in accordance with a level of the background noise.

2. The image evaluation device according to claim 1, further comprising:
    a brightness calculation section that calculates brightness of the input image,
    wherein the noise image generation section generates the noise image that is corrected in accordance with the brightness.

3. The image evaluation device according to claim 1, wherein the statistic value acquisition section acquires the statistic value of each of a plurality of regions in the noise image.

4. The image evaluation device according to claim 3, wherein the statistic value acquisition section determines a size of each of the plurality of regions in accordance with a predetermined field of view and observation distance and acquires the statistic value of each of the plurality of regions.

5. The image evaluation device according to claim 1, wherein the statistic value is a standard deviation of a color value in the noise image.

6. A non-transitory computer readable storage medium storing computer program, the program causing a computer to execute:
    acquiring an input image to be evaluated;
    generating a noise image that emphasizes noise included in the input image and having a particular spatial frequency that correlates with human perception;
    acquiring a predetermined type statistic value from the noise image;
    specifying an amount of noise in the input image on the basis of the statistic value; and
    calculating background noise included in the input image and having a spatial frequency different from the particular spatial frequency,
    wherein the noise image is corrected in accordance with a level of the background noise.

* * * * *